US009504268B2

United States Patent
Wang

(10) Patent No.: US 9,504,268 B2
(45) Date of Patent: Nov. 29, 2016

(54) PROCESS AND APPARATUS FOR THE MANUFACTURE OF A FROZEN PRODUCT

(71) Applicant: Conopco, Inc., Englewood Cliffs, NJ (US)

(72) Inventor: Yan Wang, Taicang (CN)

(73) Assignee: CONOPCO, INC., Englewood Cliffs, NJ (US)

( * ) Notice: Subject to any disclaimer, the term of this patent is extended or adjusted under 35 U.S.C. 154(b) by 0 days.

(21) Appl. No.: 14/646,126

(22) PCT Filed: Nov. 19, 2013

(86) PCT No.: PCT/EP2013/074175
§ 371 (c)(1),
(2) Date: May 20, 2015

(87) PCT Pub. No.: WO2014/079846
PCT Pub. Date: May 30, 2014

(65) Prior Publication Data
US 2015/0296832 A1    Oct. 22, 2015

(30) Foreign Application Priority Data

Nov. 22, 2012 (CN) .................. PCT/CN2012/085027
Jan. 4, 2013 (EP) ...................................... 13150221

(51) Int. Cl.
*A23G 3/20* (2006.01)
*A01J 11/00* (2006.01)
*B67D 3/00* (2006.01)
*A23G 9/28* (2006.01)

(52) U.S. Cl.
CPC .................................... *A23G 9/288* (2013.01)

(58) Field of Classification Search
CPC ...... A23G 9/282; A23G 9/283; A23G 9/288; A23G 9/48; A23G 9/506
USPC .................... 99/494, 450.8, 450.7, 532, 452; 426/282; 222/559
See application file for complete search history.

(56) References Cited

U.S. PATENT DOCUMENTS

| | | |
|---|---|---|
| 3,186,852 A | 6/1965 | Baker et al. |
| 2003/0056662 A1 | 3/2003 | Pritchard et al. |
| 2004/0187708 A1 | 9/2004 | Waldstrom |
| 2010/0098808 A1 | 4/2010 | Vaghela et al. |
| 2011/0177209 A1 | 7/2011 | Farina |

FOREIGN PATENT DOCUMENTS

JP    2000210024    8/2000

*Primary Examiner* — Michele L Jacobson
*Assistant Examiner* — Subbalakshmi Prakash
(74) *Attorney, Agent, or Firm* — Foley & Lardner LLP

(57) ABSTRACT

A filling means for filling an edible cone with a frozen confection comprising: a tubular housing which surrounds and is coaxial with a piston; the piston having a longitudinal passage which has an outlet at the lower end and an inlet at the upper end; and means for supplying the frozen confection to the inlet of the longitudinal passage of the piston, wherein the tubular housing has an outlet at the lower end which is a nozzle having vertical slits and the outlet of the longitudinal passage of the piston is a nozzle having a rounded aperture and wherein the piston is longitudinally movable within the tubular housing such that when the piston is seated within the tubular housing the piston covers the vertical slits, and when the piston is raised within the tubular housing the vertical slits are uncovered is provided. Also provided is a process for the production of a composite frozen product comprising the steps of: Providing an edible cone; Coating the internal surface of the cone with a fat-based coating; Filling the cone with a frozen confection; and then Adding a further portion of a frozen confection onto the frozen confection in the filled cone characterized in that step c) is carried out using a nozzle which has a rounded aperture and in that step d) is carried out using a nozzle which has an aperture capable of forming a fluted shape.

9 Claims, 3 Drawing Sheets

PROCESS AND APPARATUS FOR THE MANUFACTURE OF A FROZEN PRODUCT

TECHNICAL FIELD OF INVENTION

The present invention relates to composite frozen products comprising a cone-shaped edible receptacle filled with a frozen confection. In particular, it relates to a process for the manufacture of such composite frozen confections and a method for prolonging the organoleptic properties of the edible receptacle. It also relates to an apparatus for producing such products.

BACKGROUND TO INVENTION

Composite frozen products are very popular with consumers. Such products are exemplified by ice cream cones which comprise a crisp edible receptacle (e.g. a wafer cone) which is at least partially filled with a frozen confection (e.g. ice cream). Hand-made ice cream cones have been known for decades. They are made by placing a scoop of a frozen confection in the opening at the top of a wafer cone and are served directly to the consumer. They are sometimes augmented by the insertion of a chocolate flake, chocolate straw, wafer segment, wafer tube, and the like into the scoop of frozen confection. Sauces such as fruit sauces, fruit purees, syrups, chocolate sauces, and the like can be poured over the scoop of frozen confection. Toppings such as chocolate pieces, nut pieces, and other confectionary can be sprinkled over the frozen confection. A particularly attractive feature of these products to consumers is the crisp cone. Consumers have long expressed a preference for the juxtaposition between the cold ice cream and the contrasting dry, crisp wafer of the cone.

Composite frozen products are not just made by hand. For many years, composite frozen products, in particular ice cream cones, have also been produced on an industrial scale in which the products are pre-made in a factory prior to being packaged and distributed to the consumer via point-of-sale outlets where the pre-made cone products are sold. Such products are also popular with consumers due to their crisp cone but, in contrast to hand made products, are usually filled with a frozen confection which is extruded into the wafer cone and which fills the cone from the tip/bottom of the cone to the top. Such products are typified by the Cornetto™ product. These mass-produced products can also be provided with additional decorative features, especially fluted tops. The provision of fluted tops means that the product does not have a rounded top typical of scooped products and it is therefore distinguished from hand-made products. The fluting provides the surface of the product with an elegant appearance that has radial segments defined by ridges which radiate from the centre of the product out to the edge. The ridges are separated from one another by troughs. Such a segmented, fluted structure is visually appealing to the consumer. It provides a novel and symmetrical structure to the top of the product. It also gives an attractive appearance when a sauce is applied because the sauce runs into the troughs of the segments but the ridges are largely free from the sauce. It also allows any toppings to fall into the troughs but to leave the ridges largely visible. Fluted structures are typically achieved by extruding the frozen confection into the cone using a filling means which has a nozzle having star-shaped opening or a nozzle having slits emanating from the opening. Such nozzles extrude the frozen confection in a stream having star-shaped cross section. The frozen confection spreads out inside the cone but the last part of the dosing where the frozen confection is extruded onto the top of the product does not push against the sides of the cone. At this point, the star-shaped cross section of the extruded ice cream flow then manifests itself in the fluted top wherein the top of the product has segments defined by the ridges and troughs. The ridges that radiate from the centre of the product correspond to the points of the star shape of the extruded stream. The troughs correspond to the sections between the points of the stars.

Composite frozen products are further enhanced by the use of fat-based coatings, typically chocolate coatings, which are used to coat the interior and sometimes the exterior of the cone. Typically the coating is used to coat the internal surface of the cone which comes into contact with the frozen confection. The coating provides an enhanced eating experience through texture, flavour and visual appearance. It also acts as a moisture barrier between the frozen confection and the edible receptacle. The intention is that it prolongs the crispness of the edible receptacle during storage.

However, the performance of the fat-based coating as a moisture barrier requires improvement to ensure that the edible receptacle stays crisper for longer. Moreover, this is particularly required for mass-produced products that have fluted tops.

SUMMARY OF INVENTION

It has now been found that the crispness of edible receptacles can be prolonged by using a particular process especially applicable to composite frozen products comprising a cone-shaped edible receptacle filled with a frozen confection wherein the frozen confection has a fluted top.

Accordingly, in a first aspect the present invention provides a process for the production of a composite frozen product comprising the steps of:
a) Providing an edible cone;
b) Coating the internal surface of the cone with a fat-based coating;
c) Filling the cone with a frozen confection; and then
d) Adding a further portion of a frozen confection onto the frozen confection in the filled cone characterised in that step c) is carried out using a nozzle which has a rounded aperture and in that step d) is carried out using a nozzle which has an aperture capable of forming a fluted shape.

Preferably the nozzle used in step c) has a circular aperture.

Preferably the nozzle used in step d) comprises an aperture having slits radiating from the outlet of the nozzle.

Alternatively the nozzle used in step d) has a star-shaped aperture.

Preferably the coating in step b) is achieved by spraying the fat-based coating onto the internal surface of the cone.

Preferably the frozen confection is an ice cream.

Preferably the frozen confection has an overrun of from 50% to 150%.

Preferably the fat based coating is chocolate, a chocolate analogue, or a couverture.

Preferably step c) takes place less than 5 seconds after step b), more preferably less than 3 seconds, more preferably still less than 2 seconds, yet more preferably less than 1 second, most preferably less than 0.5 seconds.

In a second aspect, the invention provides a method for prolonging the crispness of an edible cone in a composite frozen product comprising the steps of a) Providing an edible cone;
b) Coating the internal surface of the cone with a fat-based coating; and then
c) Filling the cone with a frozen confection characterised in that step c) is carried out using a nozzle which has a rounded aperture.

Preferably the aperture is circular.

Preferably step c) takes place less than 5 seconds after step b), more preferably less than 3 seconds, more preferably still less than 2 seconds, yet more preferably less than 1 second, most preferably less than 0.5 seconds.

The present invention also provides a filling means specifically configured to achieve the objective of the invention. Accordingly, a further aspect of the invention provides a filling means for filling an edible cone with a frozen confection comprising:

a tubular housing which surrounds and is coaxial with a piston;
the piston having a longitudinal passage which has an outlet at the lower end and an inlet at the upper end; and
means for supplying the frozen confection to the inlet of the longitudinal passage of the piston wherein the tubular housing has an outlet at the lower end which is a nozzle having vertical slits and
the outlet of the longitudinal passage of the piston is a nozzle having a rounded aperture and wherein the piston is longitudinally movable within the tubular housing such that when the piston is seated within the tubular housing the piston covers the vertical slits, and
when the piston is raised within the tubular housing the vertical slits are uncovered.

In an alternative embodiment, the outlet at the lower end of the tubular housing may be in the form of any nozzle capable of delivering a fluted product, for example a nozzle having a star-shaped aperture.

DETAILED DESCRIPTION OF THE INVENTION

Figure 1:
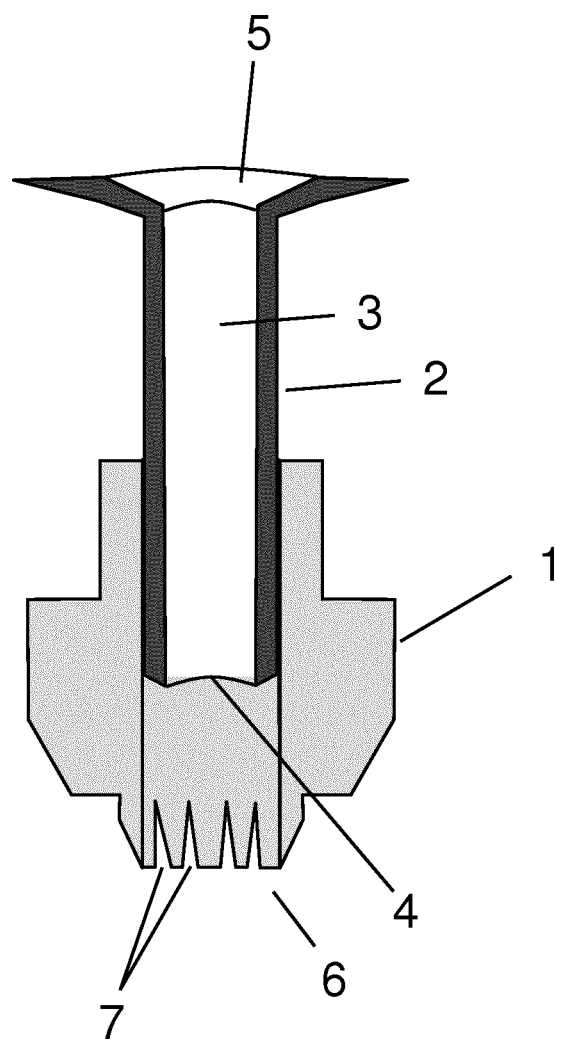
FIG. 1 shows a filling means according to the invention.

Unless defined otherwise, all technical and scientific terms used herein have the same meaning as commonly understood by one of ordinary skill in the art (e.g. in frozen confectionery manufacture). Definitions and descriptions of various terms and techniques used in frozen confectionery manufacture are found in Ice Cream, 6th Edition, R. T. Marshall, H. D. Goff and R. W. Hartel (2003), Kluwer Academic/Plenum Publishers. All percentages, unless otherwise stated, refer to the percentage by weight, with the exception of percentages cited in relation to the overrun.

As used herein, frozen confection means an edible confection made by freezing a mix of ingredients which includes water. Frozen confections typically contain fat, non-fat milk solids and sugars, together with other minor ingredients such as stabilisers, emulsifiers, colours and flavourings. Preferred frozen confections include ice cream, frozen yoghurt, sorbet, sherbet, milk ice and the like. Water ices and fruit ices are another preferred frozen confection but these typically contain less fat and non-fat milk solids. These frozen confections can be prepared using known techniques. Frozen confections are typically aerated. The term aeration means that gas has been incorporated into a product to form air cells. The gas can be any gas but is preferably, particularly in the context of food products, a food-grade gas such as air, nitrogen or carbon dioxide. The extent of the aeration can be measured in terms of the volume of the aerated product. The extent of aeration is typically defined in terms of "overrun". In the context of the present invention, % overrun is defined in volume terms as:

$$\text{Overrun (\%)} = \frac{(\text{volume of final aerated product} - \text{volume of unaerated mix})}{\text{volume of unaerated mix}} \times 100$$

The amount of overrun present in the frozen confection will vary depending on the desired product characteristics and is preferably at least 25%, more preferably at least 50%, more preferably still at least 75% and preferably at most 200%, more preferably at most 150%.

Frozen confections may be manufactured by any suitable process, typically by preparing a mix of ingredients; then pasteurising and optionally homogenising the mix; and then freezing and optionally aerating the mix to produce the frozen confection.

Wafer cones are common components of composite frozen confections. They are typically crisp, sweet, thin, dry biscuit confections containing flour, sugar, fat and/or oil and water. Cones may be made from a batter of wheat flour or refined wheat flour, sugar, edible oil, lecithin and water. Cones can be made by methods known in the art. One method for preparing a cone is by a molding process. This process includes the steps of depositing the batter into a mold; inserting a core into the mold such that the batter is forced to assume the shape of the cavity provided between the core and the mold; subjecting the mold to heat for an appropriate length of time; and discharging the cones from the mold at the completion of the specified time. Prepared cones are preferably discharged onto a conveyor for trimming, packing, coating, filling, storage and distribution. By this method cones of various shapes including but not limited to conical shape or cups of various sizes and configurations may be made. Another method of preparing an ice-cream cone is by a rolling process. This process includes the steps of depositing the batter between two baking plates; baking a flat wafer between the plates; transferring the flat wafer sheet to a rolling device; and rolling the flat waffle into a conical shape. Ice-cream cones made by this process are sometimes referred to as called sugar roll cones.

Such wafer-based edible receptacles may include 45 to 80 wt % wheat flour. Preferred compositions include 48 to 80 wt % wheat flour. More preferred compositions include 50 to 75 wt % wheat flour. Further preferred compositions include 55 to 70 wt % wheat flour, and optimal compositions include 58 to 65 wt % wheat flour. The wafer-based edible receptacles also include 15 to 50% by weight of sugar. Preferred compositions include at least 17%, more preferably at least 19%, still more preferably at least 21%, or even at least 25%, but preferably not more than 45%, more preferably not more than 40%, still more preferably not more than 35%, even more preferably not more than 30% by weight of sugar. They may also include 1 to 30 wt % edible oil. Preferred compositions include 1 to 15 wt % edible oil. More preferred compositions include 1 to 8 wt % oil. Further preferred compositions include 1.5 to 6 wt % oil. Still further preferred composition include 2 to 5.5 wt % of edible oil, and optimal compositions include 2.5 to 4.5 wt % edible oil. The edible oil may be selected from any of the known sources. Preferably the edible oil is a $C_{12}$-$C_{18}$ edible oil. Preferably the edible oil is palm oil or coconut oil. Further, the wafer-based edible receptacles may include 0 to 3 wt % lecithin. Preferred compositions include 0.1 to 2 wt % lecithin. More preferred compositions include 0.2 to 0.8 wt % lecithin. Further preferred compositions include 0.3 to 0.7 wt % lecithin. Still further preferred compositions include 0.35 to 0.65 wt % lecithin, and optimal compositions include 0.4 to 0.6 wt % lecithin. Finally, a wafer-based edible receptacle may include a small amount of water. However, in order to keep the cone crispy during storage, it is preferred that the edible receptacle is substantially free of water. By substantially free of water is meant, not more than 3%, more preferably not more than 2%, still more preferably not more than 1%, even more preferably not more than 0.5%, yet more preferably not more than 0.2%, or even less than 0.1% by weight of water.

Optional ingredients for wafer-based edible receptacles include caramel which acts as a colouring agent when added to the edible receptacle. It is an amorphous, dark-brown material that has been produced by the carefully controlled heat treatment of saccharine materials such as dextrose, invert sugar, lactose, malt syrup, molasses, sucrose, starch hydrolysates and fractions thereof, etc. The heavy-bodied, almost black syrup contains colour components that impart the amber shade found in carbonated beverages, pharmaceutical and flavoring extracts, candies, soups, bakery products, and numerous other foods. When caramel is present the edible receptacle preferably includes about 0.2 wt % of caramel. A wafer-based edible receptacle cone may also preferably include salt. Preferred salt is sodium chloride. When present the cone preferably includes about 0.2 wt % of salt.

Fat-based coatings are commonly used in an attempt to create a barrier between the edible receptacle and the frozen confection it contains. Such fat-based coatings include chocolate, chocolate-based compositions, chocolate analogues, and couvertures. The term chocolate as used herein includes dark chocolate and milk chocolate. The term chocolate analogue means chocolate-like fat-based confectionery compositions made with fats other than cocoa butter (for example cocoa butter equivalents, coconut oil or other vegetable oils). Such chocolate analogues are sometimes known as couvertures. Chocolate analogues need not conform to standardized definitions of chocolate which are used in many countries. In addition to fat and cocoa solids, chocolate and chocolate analogues may contain milk solids, sugar or other sweeteners and flavourings.

These fat-based coatings will typically have a melting point of about 30-50° C. and should therefore be solid at room temperature and mostly solid under the conditions and temperatures at which frozen confections are dosed into edible receptacles and at which the coated edible receptacles are stored either in an empty state or having been filled with a frozen confection.

In the process according to the invention, cones as described above can be placed in an upright position into appropriate receptacles in a conveyer—for example cone-shaped cups, or between parallel conveying bands. Preferably cone sleeves are also provided in which case the sleeves are placed into the conveyer in an upright position and the cones are placed into the respective sleeves. In a preferred embodiment the sleeve is higher than the cone such that the cone sits within the sleeve. The internal surface of the cone is then coated with a fat-based coating. In this step a fat-based coating as described above is heated until molten. The fat-based coating is then applied for example by projecting it from a nozzle at pressure onto the surface of the edible receptacle that a frozen confection would otherwise come into contact with. The nozzle sprays the internal surface of the edible receptacle that is to be coated in a manner akin to spray painting. If the cone is within a sleeve then the internal surface of the upper part of the sleeve that is higher than the cone and therefore not covered by the cone will also be coated with the coating.

The coated cone is then moved to a filling station where it is filled with a frozen confection. The cone can moved to the filling station or the filling station can be moved to be positioned over the cone. The frozen confection is extruded from the filling station to fill the cone from the tip/bottom to the top. In the early stages of filling, the frozen confection is extruded from the filling means via a nozzle having rounded aperture. By rounded, it is meant that the outlet of the nozzle has a largely curved/ovoid shape with no distinct angles. Preferably the outlet is substantially circular, more preferably it is circular. As a consequence, the frozen confection that is extruded from the filling station in the early stages of filling is extruded as a stream having a rounded, preferably circular cross section. It is notable that such a nozzle is not capable of providing a fluted product as described above and therefore the fluted top must be added in a subsequent filling step. The present invention has found that if the first stage of filling the cone is carried out using a nozzle that is capable of providing a fluted finish then the performance of the fat-based coating as a moisture barrier is negatively effected and the cone will not maintain its crispness for a prolonged period. Without wishing to be bound by theory, it is believed that the extruded stream of frozen confection produced from such a nozzle has sharply defined ridges which scour the surface of the fat-based coating during filling and diminish its ability to act as a moisture barrier. Conversely, the smooth surface of the stream extruded from the rounded nozzle does not damage the fat-based coating layer and so the moisture barrier performance is maintained.

After this initial filling step the cone may be partially or completely filled. If a cone sleeve is used it can even be filled slightly past the top of the cone because the internal surface of the cone sleeve will have been coated with the fat-based coating and the sleeve will still support the frozen confection.

The fluted top is then added by dispensing a further portion of the frozen confection onto the filled cone, this time using a nozzle which has an aperture capable of forming a fluted shape. Such a nozzle can be star shaped or can be a nozzle with slits that emanate from the outlet. This nozzle does not extrude a stream having a rounded cross section. Rather the cross section of the extruded stream is star shaped. As the frozen confection spreads against the internal surface of the cone or the cone sleeve it takes on the shape of the cone or sleeve. The last part of the dosed frozen confection however does not push against the sides of the cone sleeve, it sits on top of the product and the cross section of the extruded ice cream flow then manifests itself in the fluted top. By fluted, it is meant that the top of the product has segments defied by ridges with troughs in between. The ridges radiate from the centre of the product and correspond to the points of the star shape of the extruded stream. The troughs correspond to the sections between the arms of the stars. For example, if the nozzle has an aperture with 8 slots or is in the shape of an 8-pointed star then the fluted top will have 8 segments defined by 8 ridges and the 8 ridges will correspond to the 8 slots or the 8 points of the star.

This process can be achieved using two separate filling stations with two different nozzles. The nozzles will have to be moved into position above the cone or the cone will have to be moved between the nozzles. There is therefore a need for a filling means which will overcome this complication in the production process.

The present invention therefore provides a new filling means as shown in FIG. 1. The filling means comprises a tubular housing (1) which surrounds and is coaxial with a piston (2) which can move within the tubular housing along the vertical axis. The piston (2) has a longitudinal passage (3) which has an outlet (4) at the lower end and an inlet (5) at the upper end. The apparatus also has a supply means (not shown) for providing frozen confection to the inlet (5).

The tubular housing (1) has an outlet at the lower end (6) which is capable of forming a fluted product. This nozzle can be in the form of an outlet having vertical slits (7), or in another embodiment can be star shaped. The outlet (4) of the longitudinal passage (3) of the piston (2) is a nozzle having a rounded aperture.

Figure 2:
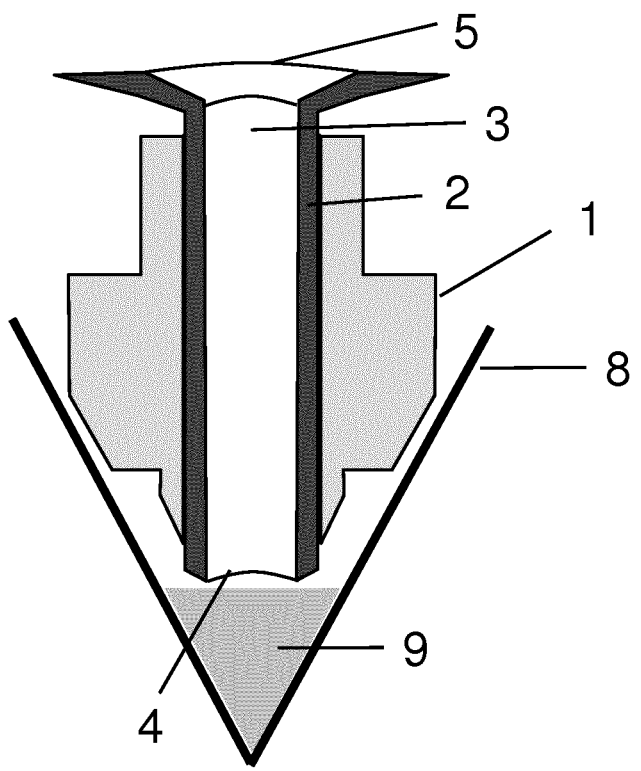
FIG. 2 shows a filling means according to the invention in an initial stage of operation.
Figure 3:
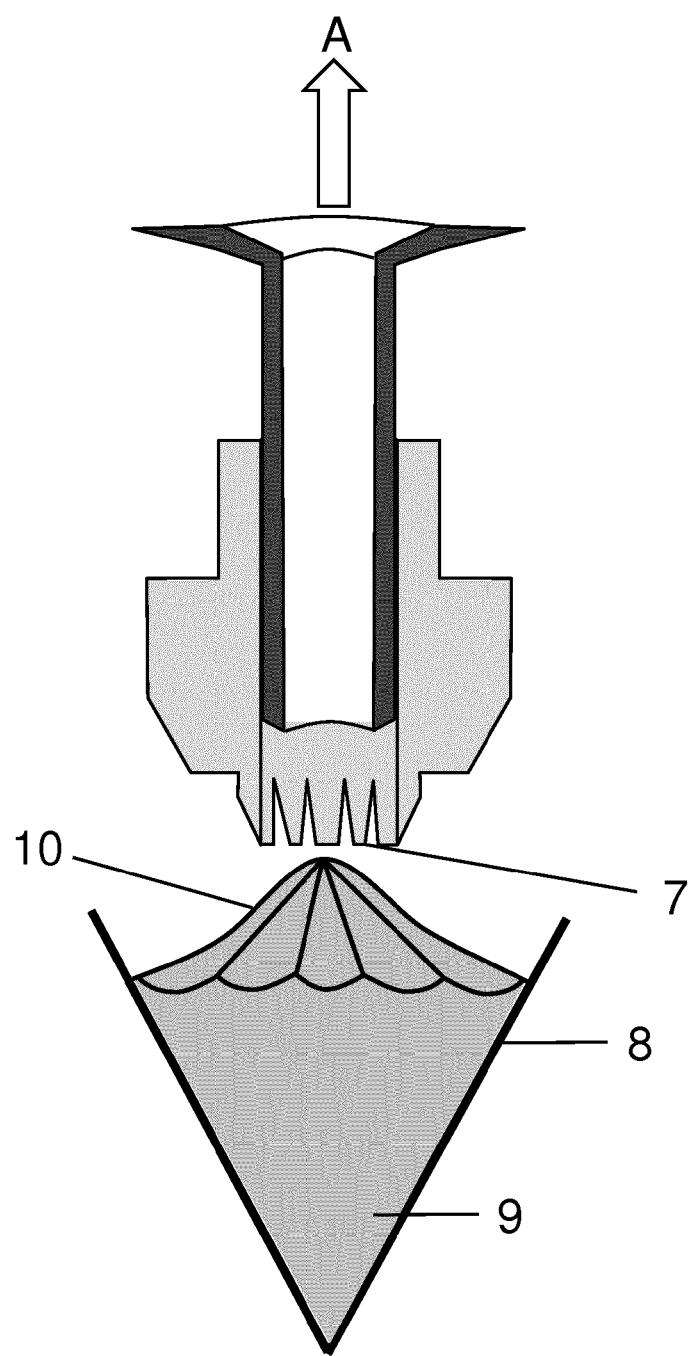
FIG. 3 shows a filling means according to the invention in a further stage of operation.

The apparatus is shown in use in FIGS. 2 and 3. The filling means is positioned above or within a coated cone (8). The piston (2) is seated within the tubular housing (1) as shown in FIG. 2, such that the piston covers the vertical slits. A frozen confection (9) is supplied via inlet (5) and extruded directly from outlet (4) into the cone (8) (for the sake of clarity the passage of the frozen confection through the inlet (5), the passage (3) and the outlet (4) is not shown). Since the frozen confection (9) is extruded directly from outlet (4) it is in a stream having a rounded cross section. This initial filling step therefore does not damage the coating of the cone (8). Once the cone has been filled to a sufficient level in the initial stage (e.g. to a point where the cone is completely filled) the fluted top (10) is then applied. This step is shown in FIG. 3 in which the piston (2) has been raised within the tubular housing in the direction of arrow A while the frozen confection continues to be pumped though the apparatus. The filling means itself has been moved out of the cone in order to accommodate the frozen confection (9) that has been pumped into the cone. In this configuration the vertical slits (7) are therefore no longer covered by the piston (2) and hence the frozen confection exits the filling means via the outlet (6) of the tubular housing and via the vertical slits (7). Consequently, the frozen confection is extruded in a stream having a star-shaped cross section and the fluted top (10) is formed on the top of the product in the manner described above.

Due to the prevention of damage caused by the initial filling step of the cone the timing between coating and filling the cone can be greatly reduced. Normally the coating must be allowed to fully set in order to prevent damage during filling but in the process of the invention this time can be reduced to less than 5 seconds, more preferably less than 3 seconds, more preferably still less than 2 seconds, yet more preferably less than 1 second, most preferably less than 0.5 seconds.

The present invention will now be further described with reference to the following non-limiting examples.

EXAMPLES

Cones

Standard cones were prepared as follows: Batter was prepared according to the formulation of table 1. The water was heated to 32-33° C. into which the salt was dissolved. The sugar and potato starch were added, followed by the wheat flour. The mixture was gently stirred for 2 min and then a mixture of the melted oil and lecithin were stirred in for a further 60 sec. 20 g of the batter was deposited onto a bottom baking plate which was at a temperature of 235° C. The batter was briefly (1.5 seconds) allowed to spread. A top baking plate at a temperature of 245° C. was then lowered onto the batter and left in place for 60 seconds to bake the batter. The top baking plate was lifted, the bottom baking plate was moved into a position under to a suction cup on a swinging arm which removed the wafer sheet from the bottom baking plate and transferred it to a cone forming apparatus. The cones thus formed were allowed to cool.

TABLE 1

Batter formulation

| Ingredient | wt % |
| --- | --- |
| Wheat flour | 39.9 |
| Potato starch | 2.1 |
| Sugar | 17.5 |
| Salt | 0.6 |
| Coconut oil | 4.0 |
| Sunflower lecithin | 0.3 |
| Water | To 100 |

Coating

The fat-based coating material of table 2 was heated to 45° C. and melted. The cones were placed in cone sleeves and the molten coating was sprayed onto the internal surface of the cones to a thickness of from about 1 mm to 2 mm.

TABLE 2

Fat-based coating material formulation

| Ingredient | wt % |
| --- | --- |
| Sugar | 41.75 |
| Cocoa mass | 5.97 |
| Cocoa butter | 26.65 |
| Skim milk powder | 15.91 |
| Butter fat | 9.15 |
| Polyglyceryl polyricinoleate | 0.15 |
| Ammonium phosphatides | 0.40 |
| Vanillin | 0.02 |

Ice Cream

A frozen confection was prepared as follows: The components of the formulation of table 3 were combined together to form an aqueous blend which was heated to 80° C. and mixed. The mix was homogenised at 160 bar, pasteurised at 82° C. for 26 seconds, cooled to 5° C., and then pumped into ageing tanks. The mix was aged with stirring at 5° C. for 72 hours in the tanks prior to use. After ageing, the mix was passed into a scraped surface heat exchanger where it was partially frozen and aerated to an overrun of 75%. The partially frozen aerated ice cream exited the freezer at an outlet temperature of −8° C.

TABLE 3

Ice cream formulation

| Ingredient | wt % |
| --- | --- |
| Coconut oil | 9 |
| Glucose-Fructose syrup (contains 9% Fructose) | 4.6 |

TABLE 3-continued

Ice cream formulation

| Ingredient | wt % |
|---|---|
| Monodiglyceride 60% - emulsifier | 0.4 |
| Carragenan - stabiliser | 0.04 |
| Beta carotene (10%) - colour | 0.004 |
| Sucrose | 14.08 |
| Whey protein (30% total solids) | 2.72 |
| Skim milk powder | 7.75 |
| Locust Bean Gum | 0.29 |
| Vanilla pods | 0.2 |
| Water | to 100 |

Storage Tests

The ice cream was extruded at a temperature of −8° C. into the coated cones within 5 to 10 seconds of the cones having been coated. One set of cones were filled using a standard nozzle having slits (Comparative example A). A further set of cones were filled using the apparatus and process of the invention (Example 1)—i.e the coated cone was first filled from the outlet of the piston and the fluted top was then added using the outlet of the tubular body.

All cones were stored at a temperature of −10° C. Storage at this temperature provides an accelerated model of product longevity because each day of storage at −10° C. is approximately equivalent to 11 days of storage at the normal temperature (i.e. −25° C.). Samples of Comparative example A and Example 1 were removed at regular intervals (equivalent to 7 days of normal storage). It was found that the cones of Comparative example A maintained an acceptable level of cone crispness for an equivalent of 28 weeks (average). Conversely, the cones of Example 1 maintained an acceptable level of cone crispness for an equivalent of 42 weeks (average). It can therefore be readily appreciated that the process and apparatus of the present invention deliver an improvement of cone crispness of approximately 50%.

The invention claimed is:

1. A filling means for filling an edible cone with a frozen confection comprising:
    a tubular housing 1 which surrounds and is coaxial with a piston 2;
    the piston 2 having a longitudinal passage 3 which has an outlet 4 and an inlet 5; and
    means for supplying the frozen confection to the inlet 5 of the longitudinal passage 3 of the piston 2 wherein
    the tubular housing 1 has an outlet 6 at the lower end which is a nozzle having vertical slits 7 and
    the outlet 4 of the longitudinal passage 3 of the piston 2 is a nozzle having a rounded aperture and wherein the piston 2 is longitudinally movable within the tubular housing 1 such that
    when the piston 2 is seated within the tubular housing 1 the piston 2 covers the vertical slits 7, and
    when the piston 2 is raised within the tubular housing 1 the vertical slits 7 are uncovered.

2. A process for the production of a composite frozen product using the filling means of claim 1 comprising the steps of:
    a) providing an edible cone;
    b) coating the internal surface of the cone with a fat-based coating;
    c) filling the cone with a frozen confection; and then
    d) adding a further portion of a frozen confection onto the frozen confection in the filled cone;
    characterized in that step c) is carried out using the filling means wherein piston 2 is seated within the tubular housing 1 thereby covering the vertical slits 7 and in that step d) is carried out using the filling means wherein the piston 2 is raised within the tubular housing 1 thereby uncovering vertical slits 7.

3. A process according to claim 2 wherein the nozzle used in step c) has a circular aperture.

4. A process according to claim 2 wherein the nozzle used in step d) comprises an aperture having slits radiating from the outlet of the nozzle.

5. A process according to claim 2 wherein the nozzle used in step d) has a star-shaped aperture.

6. A process according to claim 2 wherein the coating in step b) is achieved by spraying the fat-based coating onto the internal surface of the cone.

7. A process according to claim 2 wherein the frozen confection is an ice cream.

8. A process according to claim 2 wherein step c) takes place less than 5 seconds, less than 3 seconds, less than 2 seconds, less than 1 second, or less than 0.5 second after step b).

9. A filling means according to claim 1 wherein the outlet 6 at the lower end of the tubular housing 1 is in the form of a nozzle having a star-shaped aperture.

* * * * *